United States Statutory Invention Registration [19]

[11] Reg. Number: H229

Phillips [43] Published: Mar. 3, 1987

[54] ENVIRONMENTAL TEST CHAMBER

[76] Inventor: David E. Phillips, 618 Camelot Dr., Bel Air, Md. 21014

[21] Appl. No.: 633,000

[22] Filed: Jul. 20, 1984

[51] Int. Cl.[4] ..... F25B 29/00; G01F 15/14

[52] U.S. Cl. ..... 165/96; 165/3; 165/32; 165/20; 165/481; 73/865.5; 374/134; 261/142

[58] Field of Search ..... 165/DIG. 6, 98, 96, 165/32, 3, 48 R, 49, 20; 73/432 SD; 374/134, 141, 57; 261/142; 236/49, 1 R

[56] References Cited

U.S. PATENT DOCUMENTS

| | | | |
|---|---|---|---|
| 1,827,530 | 10/1931 | Le Grand | 73/432 SD |
| 2,018,780 | 10/1935 | Folsom | 165/3 |
| 2,058,919 | 10/1936 | Sewell | 165/3 |
| 2,243,931 | 6/1941 | Webster | 165/49 |
| 2,523,322 | 9/1950 | Ornstein et al. | 374/57 |
| 2,547,367 | 4/1951 | Booth | 165/3 |
| 2,795,082 | 6/1957 | Laine | 73/432 SD |
| 2,917,287 | 12/1959 | Tryon | 165/18 |
| 2,943,842 | 7/1960 | Sullivan | 165/18 |
| 3,327,536 | 6/1967 | Fitzgerald | 73/432 SD |
| 3,957,932 | 5/1976 | White | 261/142 |
| 3,990,201 | 11/1976 | Falbel | 165/96 |
| 4,035,796 | 7/1977 | Hedly et al. . | |

FOREIGN PATENT DOCUMENTS

| | | | |
|---|---|---|---|
| 1253866 | 3/1964 | Fed. Rep. of Germany | 165/DIG. 6 |
| 2212448 | 9/1973 | Fed. Rep. of Germany | 261/142 |
| 2326471 | 12/1974 | Fed. Rep. of Germany | 261/142 |

*Primary Examiner*—John F. Terapane
*Assistant Examiner*—Susan Wolffe
*Attorney, Agent, or Firm*—Saul Elbaum; Anthony T. Lane; Alan J. Kennedy

[57] ABSTRACT

A test chamber for simulating outdoor environmental conditions including the controlled formation of dew or frost on test objects in the chamber. Air processing equipment connected to the chamber includes two types of humidifying equipment, two types of dehumidifying apparatus, and a heating/cooling system using a secondary heating/cooling fluid which heats and/or cools the air without condensation. A radiative cooling system comprising a chilled black body absorbs heat from test objects to induce dew or frost formation. The equipment is controlled by a microprocessor.

1 Claim, 3 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 2
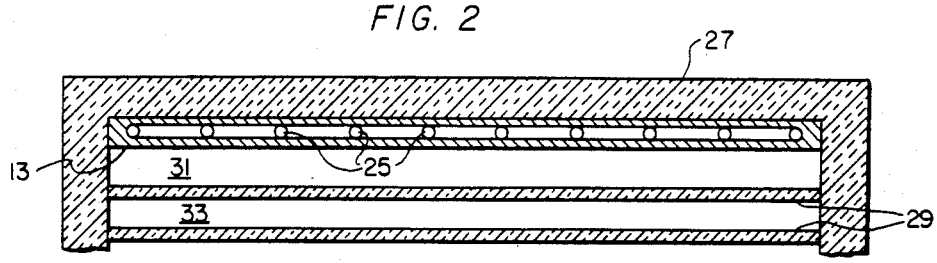
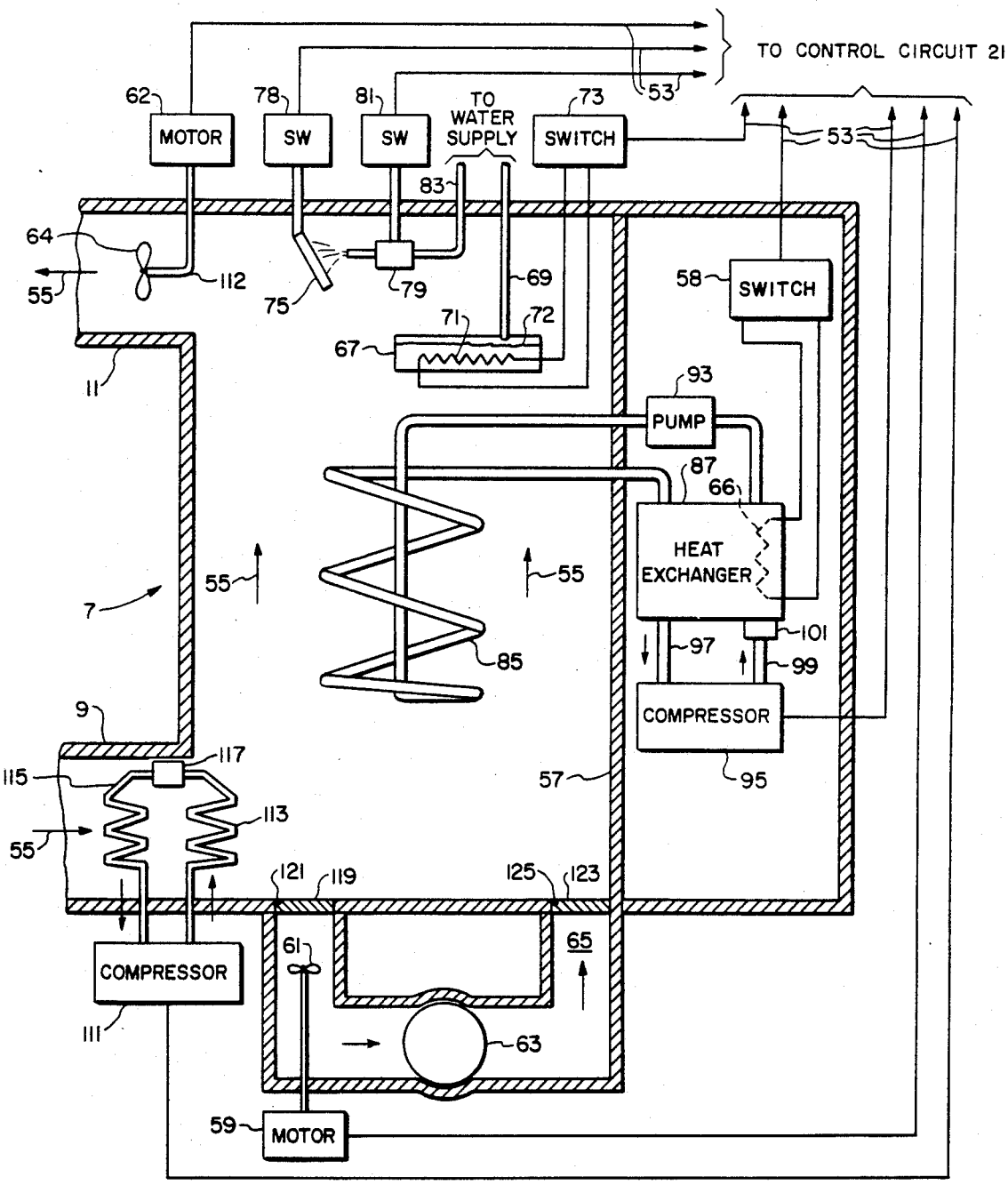
FIG. 3

ENVIRONMENTAL TEST CHAMBER

RIGHTS OF THE GOVERNMENT

The invention described herein may be manufactured and used by and for the United States Government without the payment to me of any royalty thereon.

BACKGROUND OF THE INVENTION

The field of this invention is simulated environmental testing and more particularly relates to a test chamber which is capable of simulating a broad spectrum of environmental conditions to which equipment might be subjected in field use. The value and need for such test chambers is obvious. Prototypes of new designs of all sorts of military equipment, for example military vehicles, electronic equipment, clothing, engineering structural equipment, medical equipment, ammunition, and even food supplies must be tested in many types of environments in which the equipment may be stored or required to operate, from the snow covered mountains of Alaska to tropical jungles.

Prior art test chambers of this type have been equipped to provide control of humidity only above 32° F. Dew or frost was never formed in such chambers in a controllable manner. It could have been formed if a cold object were placed in a warmer and humid chamber, however this method of dew or frost formation is inconvenient and more important, not subject to precise controls.

The chamber of the present invention is a novel and versatile one which provides controllable dew and frost formation by means of a chilled black body heat absorber which simulates the radiative cooling of outdoor objects which takes place on clear nights. By controlling the temperature of the black body heat absorber and the temperature and humidity of the air in the chamber, any degree of dew or frost buildup can be induced on test objects in the chamber.

SUMMARY OF THE INVENTION

The test chamber comprises a walk in type insulated room with air temperature, humidity and other sensors located therein. The heating, cooling, humidifying, and dehumidifying equipment is located outside of the chamber and is arranged to control the chamber air temperature and humidity in response to a microprocessor based control circuit which has as inputs the aforementioned sensors. The heat absorbing black body is mounted in the ceiling of the chamber and is insulated from direct contact with the air therein. The black body absorber is cooled by a refrigeration system which may be controlled by the surface temperature of the equipment under test or by the difference between the surface temperature of the item under test and the chamber air temperature.

The control circuit can be designed to respond to such conditions as the opening of the chamber door or the presence of personnel in the chamber to modify the temperature/humidity algorithm in a manner which will rapidly bring the chamber air temperature/humidity to its desired values.

Humidification is achieved by an electrically heated water reservoir located in the aforementioned external air processing unit which provides coarse changes in test chamber humidity and by spraying a measured charge of water in the form of a mist or fine stream onto an electrically heated plate mounted in the conditioned air stream which provides fine increases.

It is thus an object of the invention to provide an environmental test chamber in which the air temperature and humidity can be controlled over wide ranges and which is provided with a chilled heat absorber or heat sink which absorbs heat from test objects within said chamber to permit selective building up of dew or frost on said test object.

Another object of the invention is to provide an environmental test chamber equipped with a microprocessor-based control circuit for controlling heating, cooling, humidifying and dehumidifying equipment for controlling the air temperature/humidity inside of said chamber and a chilled black body heat sink for absorbing heat from equipment under test inside of said chamber, whereby dew and frost may be induced on said equipment in controllable amounts at controllable air temperature/humidity to simulate outdoor ambient conditions, and wherein said microprocessor-based control circuit is designed to take into account the fact that the door of said chamber opens or that personnel are present in said chamber in its control algorithm for regulation of the temperature/humidity of said chamber.

These and other features and advantages of the invention will become apparent from the following detailed description and the drawings.

BRIEF DESCRIPTION OF THE DRAWINGS

FIG. 2 shows a cross-sectional view of the black body heat sink mounted in the ceiling of the test chamber.

FIG. 3 shows illustrative equipment which may be used to process the air of the test chamber to control the temperature/humidity thereof in a desired manner.

DETAILED DESCRIPTION OF A PREFERRED EMBODIMENT

Figure 1:
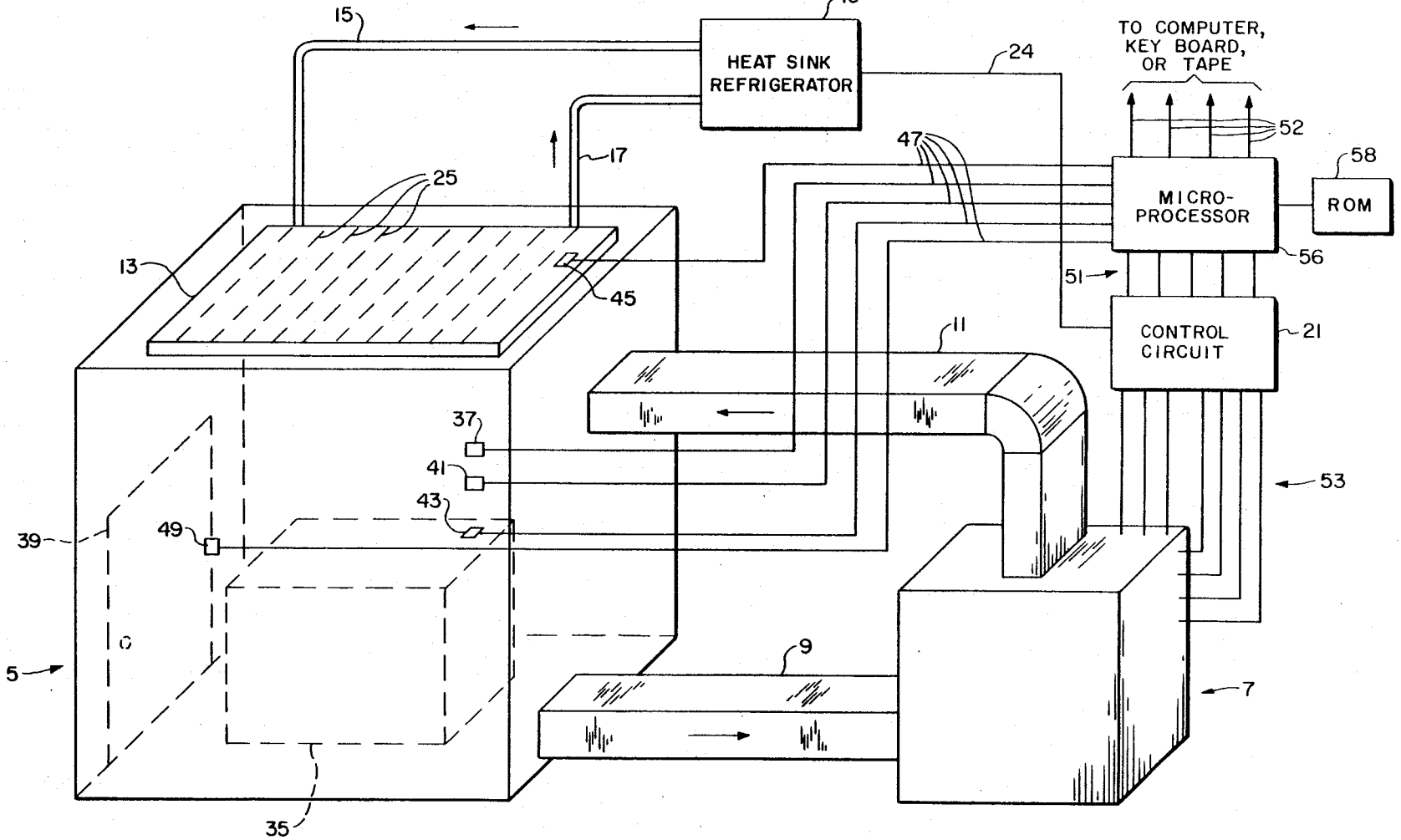
FIG. 1 is a combination pictorial and schematic view of the entire system.

In FIG. 1 the test chamber 5 is built with insulated walls, floor and ceiling. The air processing equipment 7 is externally mounted and connected to the interior of the test chamber by means of ducts 9 and 11. The lower duct 9 may be used to remove the chamber air for processing and the upper duct 11 to return the processed air to the chamber, as indicated by the arrows on these ducts.

In the ceiling of the chamber 5 is mounted the black body heat absorber or heat sink 13, also shown in more detail in FIG. 2. The heat sink may comprise, for example, a plate of high thermal conductivity such as copper, with the lower surface thereof, which is exposed to the interior of the chamber, coated with flat black paint or lamp black, for increasing the heat absorption capability thereof. The plate 13 has cooling tubes 25 running therethrough. The tubes 25 are supplied with chilled fluid from heat sink refrigerator 19 via pipe 15. The cooling fluid returns to the refrigerator 19 via pipe 17, as indicated by the arrow. A temperature sensor 45 attached to the heat absorber 13 measures the temperature thereof and is connected by one of the leads 47 to microprocessor 56. Also, as shown in FIG. 2, the heat sink 13 is mounted under insulated ceiling 27 and is shielded from direct contact with air inside the chamber by two or more plastic or glass plates 29. For isolation and insulation purposes, the spaces 31 and 33 between plates 29 may be filled with dry air or evacuated. The plates are partially transparent to radiation wavelengths to be absorbed from equipment inside the chamber and they prevent contact between the cool heat sink 13 and the chamber air which would change its surface temperature and thereby reduce the heat absorption capacity thereof.

The microprocessor 56 is arranged to sense numerous conditions within the test chamber via leads 47 and actuate control circuits 21 via leads 51 fcr appropriately controlling the electrically actuated equipment to achieve desired environmental conditions within chamber 5. The microprocessor also has a set of leads 52 connected thereto which may provide programing information from external device.s such as computers, tape decks or keyboards, as indicated.

The sensors 37 and 41 within the chamber sense the air temperature and humidity therein and provide this information to the microprocessor 56 on two of the leads 47. The box labelled 35 resting on the chamber floor represents a piece of equipment under test and a temperature sensor 43 is mounted thereon and connected to the microprocessor to measure the surface temperature which will normally be below the chamber air temperature if the chilled heat absorber 13 is operating. The operation of the heat sink refrigerator 19 is controlled by control circuits 21 via lead 24.

The sensor 49 detects opening of the door 39 and this door opening information can be used to modify the temperature/humidity algorithm executed by the microprocessor to make appropriate changes in the air processing equipment to compensate for the open door. Normally the change in chamber temperature/humidity caused by an open door would be sensed by the temperature/humidity sensors 37 and 41 and cause compensation therefor, however there would be a substantial delay before the corrective action takes place and the use of a door sensor as described can accelerate the required correction.

If dew or frost formation is not desired, the heat sink refrigerator 19 is switched off by the control circuits and the microprocessor 56 will operate the air processing equipment in unit 7 through the control circuits 21 via leads 53 in response to instructions or programs built into the microprocessor or fed thereto from external control equipment over leads 52. In the event that dew or frost formation is desired the control circuits will switch on heat sink refrigerator 19 which will chill the black body heat absorber or heat sink 13 which will then absorb heat from any object within the test chamber. This radiative cooling is analogous to what takes place in nature on clear nights when the atmosphere is substantially transparent at infrared and optical wavelengths and the heat accumulated by the earth and man made objects thereon during daylight will be radiated to space and lost, thereby cooling the earth and man made objects. If the resultant cooling lowers the temperature below the dew point, condensation in the form of dew or frost will take place on the radiatively cooled surfaces. In humid air, only a slight cooling is required to form dew or frost since for such air the dew point is close to the air temperature. On cloudy or overcast nights or when the sky is obscured by haze, the atmosphere will reflect most of the energy radiated from the earth back to the surface and little or no radiative cooling will take place.

The chilled black body heat absorber 13 efficiently absorbs radiation from the test equipment 35 and anything else in the test chamber which isat a substantially higher temperature, but will emit only a small fraction of the energy absorbed because of its much lower temperature. This follows from the Stefan-Boltzmann law which holds that the energy radiated by a black body is proportional to the fourth power of the absolute temperature thereof.

FIG. 3 shows a schematic form illustrative types of equipment which may be used in the air processor 7. The arrows labelled 55 indicate the flow of air in the upper and lower ducts 11 and 9 and within unit 7. A heating/cooling coil 85 is located in unit 7 in the air stream thereof and has a secondary heating/cooling liquid, for example an anti-freeze-water mixture, pumped therethrough by means of pump 93. The heating/cooling liquid in the coil 85 is cooled or heated in heat exchanger 87 by means of a refrigerator which comprises compressor 95 and expansion valve 101, or by electric heating coils 66 which are operated by switch 58. The compressed refrigerant is supplied to valve 101 by means of pipe 99 and the gaseous refrigerant is returned to compressor 95 via pipe 97. The heat exchanger comprises means to cool the secondary heating/cooling liquid by means of cold coils connected to expansion valve 101, and also the electric heating element for heating this liquid. If air temperature reduction is desired the heat exchanger cools the secondary liquid pumped through coils 85 to a temperature which is low enough to lower the chamber air temperature to the lowest desired value but is not so low that dew or frost will be formed on the coils 85. If the refrigerator coils within heat exchanger 87 were located in the air stream 55 to achieve direct cooling of the air, the coil temperature would be so low that dew or frost buildup could take place, thus affecting air chamber humidity. As shown, the pump 93 and compressor 95 are connected to control circuit 21 by means of leads 53. If air temperature increase is required, the compressor 95 would be switched off by the control circuit and the electric heating element 66 switched on to heat the secondary heating/cooling liquid. Since the temperature of coils 85 cannot be much lower than that of the air stream 55, the coils must necessarily be large if temperature reduction is to take place rapidly.

A blower for circulating the air between the processing unit 7 and the test chamber is schematically indicated by means of motor 62 driving an impeller or fan 64 via a right angle drive 112. Motor 62 is also controlled by circuit 21 via another of the leads 53.

The first or coarse humidifier comprises a water pan 67 with an electric heating element 71 immersed in the water 72. The element 71 is connected to electrical switch 73 also controlled by circuit 21. The pan 67 is automatically kept filled with water by means of water pipe 69. The amount of evaporation from pan 67 and hence the amount of water vapor injected into the air stream 55 is a function of the temperature of the water 72 which is controlled by the heating element 71 via circuit 21.

Fine increases in chamber humidity are achieved by spraying onto a heated plate a controlled charge of water in the form of mist or a stream of fine water droplets which are sprayed by applicator 79, which may resemble a medical syringe, and which is connected to a water supply via pipe 83 and is electrically actuated by means of switch 81 which is also cohtrolled by circuit 21, as illustrated. The water droplets from applicator 79 strike electrically heated plate 75, controlled by switch 78, which is located in the air stream 55 and are vaporized to increase the humidity. The number of times the applicator is "fired" at plate 75 determines how much the humidity will be increased and the microprocessor 56 and/or the computer connected thereto will control applicator 79 in response to information derived from the humidity sensor in chamber 5 and psychrometric data contained in its permanent memory. This psychrometric data may be stored in read-only memory, ROM 58, connected to microprocessor 56.

If the computer, keyboard or microprocessor calls for a lowering of the humidity, and the humidity in the air is less than 0.005 pounds of water per pound of dry air (equivalent to 30% RH at 72° F.), a portion of the air stream passing through air processor 7 is diverted through the chamber 65 by means of a fan or blower 61 driven by motor 59 and the diverted air is passed through a continuously-regenerated desicant drum indicated by numeral 63. The desicant absorbs moisture to reduce the humidity of the air returned to the test chamber. The motor 59 is controlled by circuit 21.

The desicant de-humidifier is for making fine changes in the humidity of relatively dry air. Since the desicant can be damaged by extremely humid air, such air is prevented from entering the chamber 65 by an air-valve which may comprise doors 119 and 123 hinged at 121 and 125 at the entrance and exit to chamber 65. The doors may be held closed by springs (not shown), and opened by the suction of fan 61.

De-humidification of humid air is achieved by refrigeration apparatus comprising compressor 111 which supplies liquid refrigerant to coil 113 disposed in the air stream 55. The expansion valve 117 vaporizes the refrigerant applied thereto from coils 113 and the cold vapor passes through coils 115 also in air stream 55, and thence back to compressor 111. The cold coils 115 will cause condensation thereon and thus lower the humidity. The coils 113 will be hot since they carry the hot liquid refrigerant. By passing the air through both the hot and cold coils, the air temperature changes can be minimized.

It should be noted that de-humidification takes place at the input of the air processing unit and humidification takes place near the output thereof. Also, while the heating/cooling coil 85 has been illustrated as a helix, other shapes are possible for this coil.

The partition 57 within air processing unit 7 separates the air stream 55 from the equipment to the right thereof.

Dew or frost formation can be selectively formed on the equipment under test by suitable control of the temperature of heat sink 13 and the test chamber air temperature/humidity. For example, if the test equipment is chilled to a temperature above freezing but below the dew point of the chamber air, dew will be formed. If the moisture thus condensed out of the chamber air is continually replaced by means of air processor 7, continued dew formation will occur. Also, further reduction of the test equipment surface temperature by radiative cooling could cause the dew to freeze. If the chamber air "dew point" is below 32° F., frost will be formed when the equipment surface temperature reaches this dew point and if the chamber air humidity is maintained constant or increased as the frost is formed, any desired amount of frost buildup can be achieved.

The microprocessor can be programmed to produce these various functions or conditions in the test chamber.

While the invention has been described in connection with an illustrative embodiment, obvious variations therein will be apparent to those skilled in this art, accordingly the invention should be limited only by the scope of the appended claims.

I claim:

1. A test device for simulating outdoor environmental conditions including the controlled formation of precipitation in the form of dew and frost upon test objects located within the device comprising:

a walk-in chamber containing test objects and an entrance door;

air processing equipment associated with said chamber for controlling the air temperature and humidity within said chamber;

a chilled heat absorbing block body heat sink located in the ceiling of said chamber;

means for controlling said air processing equipment; and means for controlling the temperature of said heat sink, whereby dew or frost may be controllably formed on the test objects by controlling the temperature and humidity of the air inside said chamber in conjunction with controlling the temperature of said heat sink.

* * * * *